(12) United States Patent
Harnetiaux et al.

(10) Patent No.: US 9,788,477 B2
(45) Date of Patent: Oct. 17, 2017

(54) MOUNTING SYSTEM FOR ROW UNIT OPTIONS FOR A PLANTER

(71) Applicant: CNH Industrial America LLC, New Holland, PA (US)

(72) Inventors: Travis L. Harnetiaux, Bourbonnais, IL (US); Johnathon R. Dienst, DeKalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/755,111

(22) Filed: Jun. 30, 2015

(65) Prior Publication Data
US 2017/0000019 A1   Jan. 5, 2017

(51) Int. Cl.
A01C 7/20    (2006.01)
A01C 5/06    (2006.01)

(52) U.S. Cl.
CPC .............. *A01C 7/201* (2013.01); *A01C 5/062* (2013.01)

(58) Field of Classification Search
CPC ......... A01C 7/201; A01C 7/206; A01C 7/004; A01C 7/06; A01C 5/062; A01C 5/064; A01C 23/022; A01C 23/025
See application file for complete search history.

(56) References Cited

U.S. PATENT DOCUMENTS

| | | | |
|---|---|---|---|
| 2,514,589 A * | 7/1950 | Penman ................... | F16B 33/02 411/423 |
| 2,968,266 A * | 1/1961 | Gustafson ................ | A01C 7/06 111/125 |
| 3,162,407 A * | 12/1964 | Yax ........................ | H01Q 1/1221 248/291.1 |
| 3,718,191 A * | 2/1973 | Williams ................ | A01C 5/062 111/140 |
| 3,856,244 A * | 12/1974 | Menshen ................. | F16L 3/237 248/67.5 |
| 4,244,162 A | 1/1981 | Pucher | |
| 4,407,371 A * | 10/1983 | Hohl ........................ | A01C 7/20 111/140 |
| 4,478,159 A | 10/1984 | Melgoza | |
| 4,691,645 A | 9/1987 | Anderson | |
| 4,817,897 A * | 4/1989 | Kreusel ................... | E04B 1/585 248/68.1 |
| 5,490,470 A * | 2/1996 | House ...................... | A01C 5/06 111/186 |
| 5,632,567 A * | 5/1997 | Lowe ....................... | A01B 35/30 172/776 |

(Continued)

FOREIGN PATENT DOCUMENTS

| | | |
|---|---|---|
| EP | 2 636 291 A1 | 9/2013 |
| WO | 2010/091469 A2 | 8/2010 |
| WO | 2014/066643 A2 | 5/2014 |

*Primary Examiner* — Robert Pezzuto
*Assistant Examiner* — Adam Behrens
(74) *Attorney, Agent, or Firm* — Rebecca L. Henkel; Rickard K. DeMille

(57) ABSTRACT

An agricultural implement including a tool bar and a row unit coupled to the tool bar. The row unit includes a frame member and at least one clamping device coupled to the frame member. Each clamping device has a first member having first interior features and a second member having second interior features, with the first interior features being substantially a mirror image of the second interior features.

10 Claims, 4 Drawing Sheets

(56) References Cited

U.S. PATENT DOCUMENTS

| | | |
|---|---|---|
| 5,685,246 A | 11/1997 | Zimmerman |
| 5,697,455 A | 12/1997 | Deckler |
| 5,762,436 A * | 6/1998 | Mosdal ................. A01B 59/00 403/233 |
| 5,785,460 A | 7/1998 | Noonan et al. |
| 6,038,990 A * | 3/2000 | Simpson ................. A01C 5/062 111/124 |
| 6,435,565 B2 * | 8/2002 | Potts ....................... F16L 3/237 24/16 R |
| 7,128,007 B1 * | 10/2006 | Wiesenburger .......... A01C 7/06 111/121 |
| 7,263,937 B2 | 9/2007 | Frasier |
| 7,540,246 B2 * | 6/2009 | Friesen ................. A01C 5/064 111/167 |
| 8,037,944 B2 | 10/2011 | Arnabat Castellvi |
| 8,291,551 B2 | 10/2012 | Bruss et al. |
| 8,322,454 B2 | 12/2012 | Connell et al. |
| 8,434,593 B2 | 5/2013 | Remoué |
| 8,464,649 B2 | 6/2013 | Schilling et al. |
| 8,626,408 B1 | 1/2014 | Satzler et al. |
| 8,752,855 B2 | 6/2014 | Dilworth et al. |
| 8,807,279 B2 | 8/2014 | Remoue |
| 8,899,899 B2 | 12/2014 | Tutschek et al. |
| 8,960,322 B2 * | 2/2015 | Kester ................. A01B 15/00 172/558 |
| 8,960,512 B2 * | 2/2015 | Maenle ................. A01B 23/02 224/410 |
| 9,357,692 B2 * | 6/2016 | Johnson ............... A01B 63/008 |
| 2006/0179805 A1 | 8/2006 | Quiring |
| 2007/0246614 A1 * | 10/2007 | Allmann ............... F16L 3/2235 248/65 |
| 2009/0090284 A1 * | 4/2009 | Peterson, Jr. .......... A01C 7/046 111/185 |
| 2013/0025891 A1 | 1/2013 | Georgoulias |
| 2013/0062380 A1 * | 3/2013 | Maenle ................. A01B 23/02 224/401 |
| 2013/0186658 A1 * | 7/2013 | Kester ................. A01B 15/00 172/558 |
| 2013/0220190 A1 | 8/2013 | Remoue |
| 2013/0228107 A1 | 9/2013 | Martin |
| 2013/0248212 A1 * | 9/2013 | Bassett ................. A01B 71/02 172/4 |
| 2014/0190712 A1 | 7/2014 | Bassett |
| 2014/0238285 A1 * | 8/2014 | Schaffert ............... A01C 7/201 111/200 |
| 2014/0262381 A1 | 9/2014 | Schaffert |
| 2015/0351311 A1 * | 12/2015 | Johnson ............... A01B 63/008 172/423 |
| 2016/0234995 A1 * | 8/2016 | Gent ....................... A01C 5/06 |

\* cited by examiner

MOUNTING SYSTEM FOR ROW UNIT OPTIONS FOR A PLANTER

BACKGROUND OF THE INVENTION

1. Field of the Invention

The present invention relates to agricultural planters, and, more particularly, to optional equipment mounting devices for row units associated with agricultural planters.

2. Description of the Related Art

Farmers utilize a wide variety of seed planting implements, including seed drills and planters of various configurations. In a known type of planting implement, seed planting or row units are attached to a toolbar extending transverse to the direction of planting. The toolbar is coupled to a tractor or other work vehicle suitable for pulling the planting implement along a field that is to be seeded to a crop. Each planting unit includes a ground penetrating assembly, often including one or more discs, for opening a seed trench or furrow in the ground as the planting implement is pulled across a field. Components of the ground penetrating assembly shape the bottom and sides of the seed trench, and a seed-metering device provides individual seeds at a controlled rate for deposit in the seed trench. Furrow closing components of each row unit close the seed trench in a controlled manner.

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed. To open a trench in the soil, a furrowing disc system, also called an opening disc, cuts into the soil and rotates, dislocating soil as it rotates to form the trench.

Once the trench is open, a seed is placed in the trench by a metering device which receives seeds from the main storage tank(s) or a row unit storage tank and typically utilizes a combination of differential air pressure, to select the seed, and gravity to place the seed in the trench at predefined intervals along the pulled path so that adjacent seeds in the row are not too close to one another. One or more closing discs carried behind the furrowing disc are pressed into the soil and also rotate as the planter is pulled to replace soil dislocated by the furrowing disc in the trench or dislocate adjacent soil into the trench to cover the seed placed in the trench with soil. Finally, at least one pressing wheel carried behind the closing disc(s) exerts pressure on the soil covering the seed to press the soil down onto the seed and provide good soil contact with the seed. By having multiple row units working in unison as the planter is pulled across a field, many seeds can be effectively planted in an efficient manner.

The row units are adaptable and may have optional equipment mounted to them. Typically the optional equipment is bolted to the row unit and if additional options are added the bolts are taken off and the optional equipment is connected at the same point using the same or a longer bolt. This essentially requires disassembly before adding the options and requires that all of the supports have to be aligned to insert the bolt.

Another issue that arises with planters is that the same model can have varying configurations and those configurations need to be easily attached.

What is needed in the art is a planter row unit having an easy to attach system allowing quick configuration and re-configuration of the unit.

SUMMARY OF THE INVENTION

The present invention provides an attachment device and method of attachment of options to individual row units.

The invention in one form is directed to an agricultural implement including a tool bar and a row unit coupled to the tool bar. The row unit includes a frame member and at least one clamping device coupled to the frame member. Each clamping device has a first member having first interior features and a second member having second interior features, with the first interior features being substantially a mirror image of the second interior features.

The invention in another form is directed to a row unit capable of being coupled to a tool bar of an agricultural implement. The row unit includes a frame member and at least one clamping device coupled to the frame member. Each clamping device has a first member having first interior features and a second member having second interior features, with the first interior features being substantially a mirror image of the second interior features.

An advantage of the present invention is that the attachment of an item is accomplished without inserting a fastener through the item.

Another advantage is that there is an angular offset in the clamp allowing a clearance between adjacent items coupled by the same clamping device.

Yet another advantage of the present invention is that the item to be inserted into the clamping device, can be inserted and loosely held before the clamping device is tightened.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
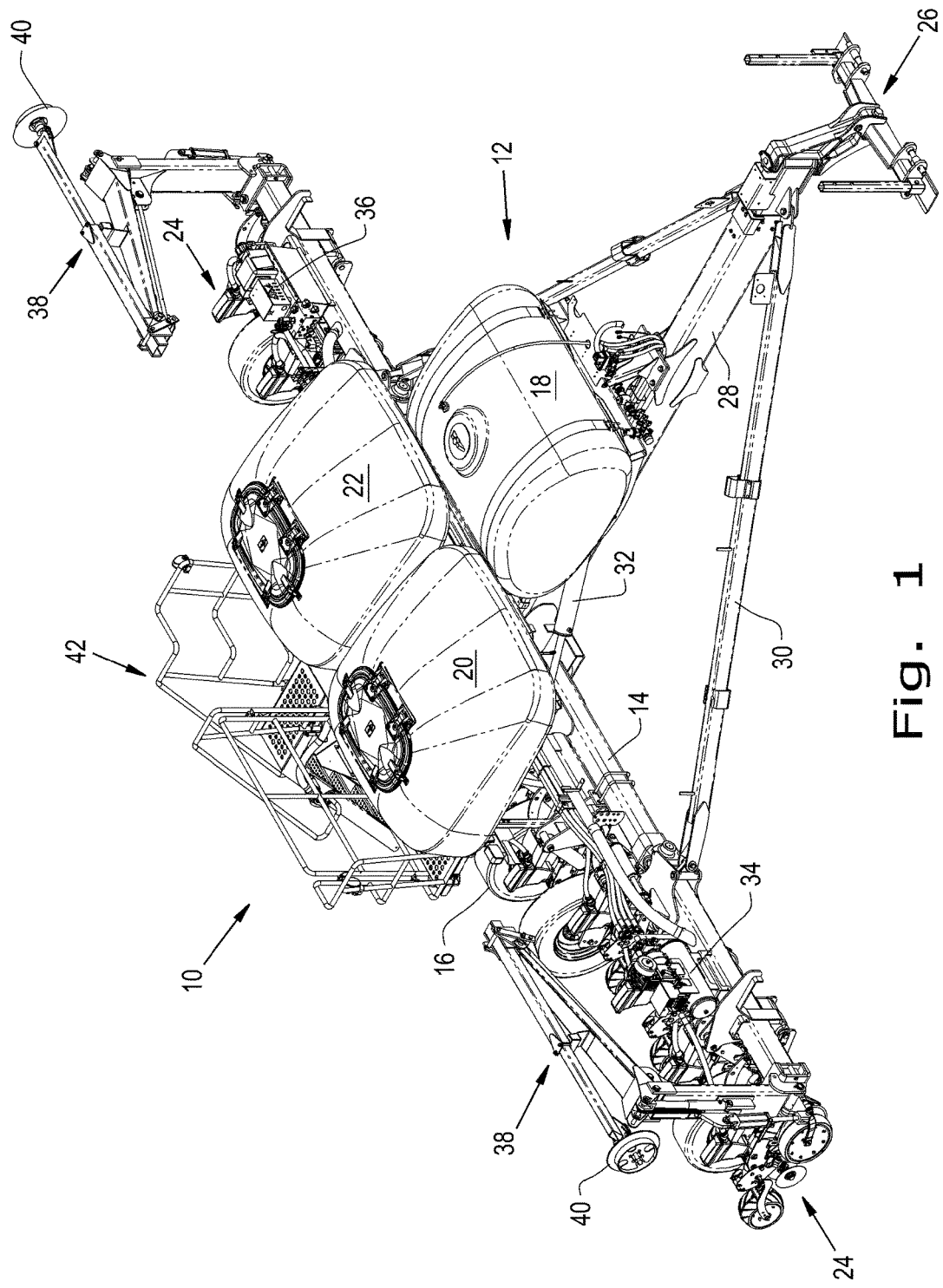
FIG. 1 is a perspective view of an agricultural implement in the form of a planter having an embodiment of an optional equipment mounting system of the present invention positioned on each of the row units thereto.

Referring now to the drawings, and more particularly to FIG. 1, there is shown an embodiment of an agricultural planter 10 according to the present invention which generally includes a chassis 12 forming a support structure for components of the planter 10 that can be formed by a hitch assembly at a front of the planter 10 connected to a tool bar 14, main wheels 16 carried by the chassis near a rear of the planter 10, one or more storage tanks 18, 20, and 22 that can be filled with seed or other agriculture material carried by the chassis, and a plurality of row units 24 connected to the tool bar 14 and arranged laterally across a length of the tool bar 14 so that they are carried by the chassis. The chassis 12 can include a hitch 26 configured to be connected to a tractor or other agricultural implement (not shown) so that the planter 10 can be pulled in a forward direction of travel. The hitch 26 can be integrally formed with or connected to a hitch bar 28 that is connected to the tool bar 14 by bracing bars 30 and one or more cylinders 32. As can be seen, the planter 10 can also have various hydraulic, pneumatic, and electrical lines (unnumbered) throughout to support various cylinders and systems that are included on the planter 10, such as a pneumatic system 34 connected to the tool bar 16 and an electric generator 36 also connected to the tool bar 16. A marking device 38 can be connected to each lateral end of the tool bar 14 and extendable so that a marking disc 40 of the marking device 38 can create a line in the soil as the planter 10 is pulled that helps a user in positioning the planter 10 to create subsequent rows. A stair assembly 42 can be mounted to the back of the planter 10 to allow for an operator to access the storage tanks 20, 22.

Figure 2:
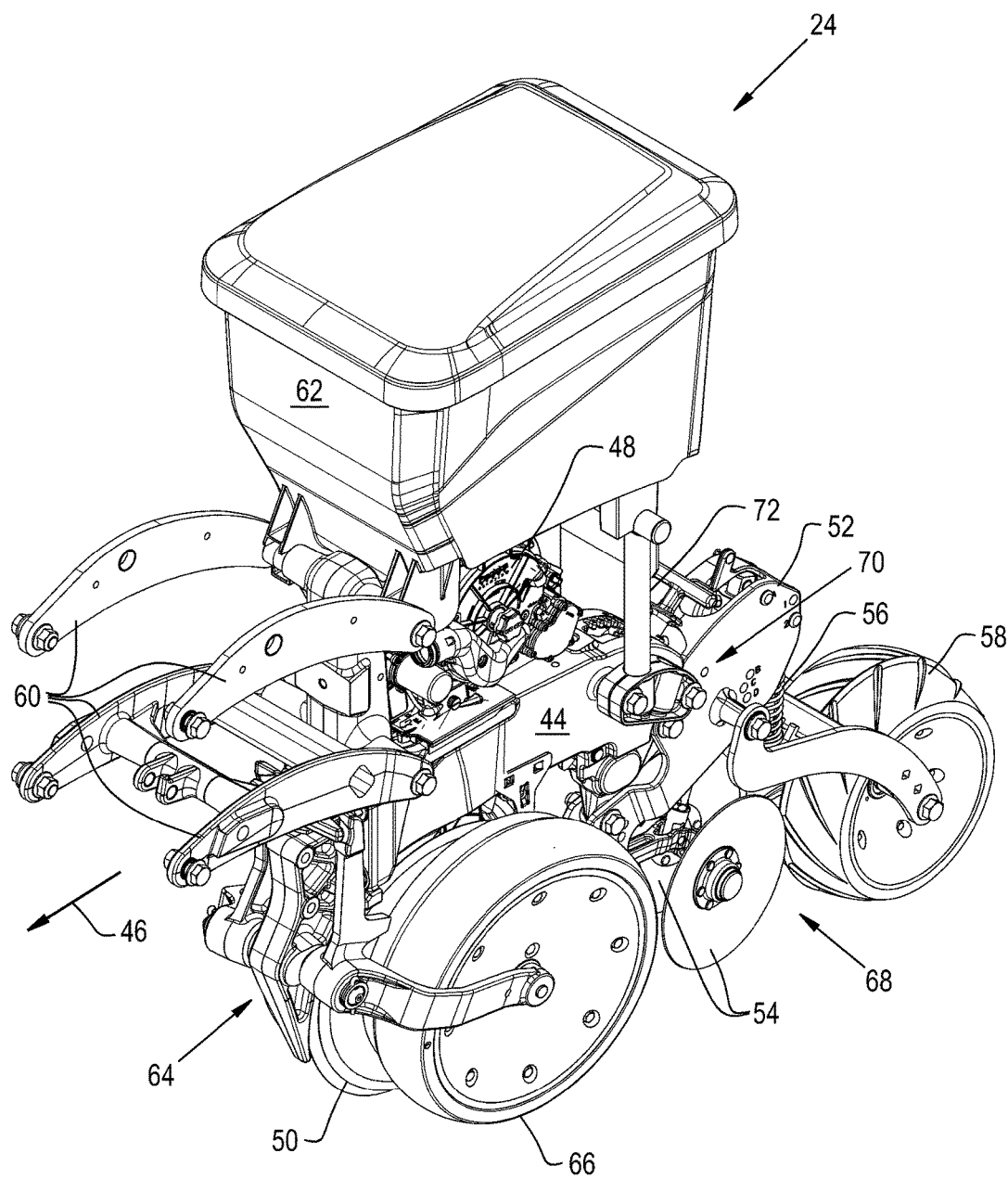
FIG. 2 is a perspective view of a row unit of the planter of FIG. 1 showing a clamping device of the mounting system of the present invention.

Now, additionally referring to FIG. 2 there is shown an embodiment of an individual row unit 24. As can be seen, the row unit 24 generally includes a frame member 44 that can be carried by the chassis 12 in a direction of travel, signified by arrow 46, a metering device 48 carried by the frame member 44, a furrowing disc 50 connected to the frame member 44, a mounting body 52 connected to the frame member 44, closing discs 54 carried by the frame member 44, a restraining member 56 connected to the mounting body 52, and a pressing wheel 58 pivotally movable relative to, and carried by, frame member 44 by way of the connection to the mounting body 52 and is positionable behind the furrowing disc 50. As can be seen, the frame member 44 can have toolbar connecting arms 60 bolted thereon that can be connected to the chassis 12 in a parallel linkage arrangement so that the row unit 24 can be carried by the chassis 12 in the direction of travel 46. In this sense, the frame member 44 acts as a row unit chassis to keep the various components of the row unit 24 together during operation.

The metering device 48 carried by the frame member 44 is configured to receive seed from a unit storage tank 62 (also known as a mini-hopper) that is carried by the frame member 44 and can connect to one or more of the main storage tanks 18, 20 or 22. For ease of illustration, the electrical and pneumatic lines that would normally be connected to the metering device 48 have been omitted. The metering device 48 can be configured as any type of device which is capable of controllably metering out seeds to be planted by the row unit 24 during operation of the planter 10. For example, the metering device 48 can utilize a metering wheel (not shown) in combination with a vacuum in the metering device 48 to selectively pull seeds into a seed drop (not shown), where the vacuum is released and gravity causes the seed to drop into soil below. Other types of metering devices are known and could readily be adopted into the row unit 24 of the present invention.

The furrowing disc 50 carried by the frame member 44 presses into the soil and rotates as the planter 10 travels along a field, displacing soil in the field to form a trench. The furrowing disc 50 can have any type of construction that allows for it to rotate as it is carried along the field to form a trench in the soil, such as the annular disc shape shown. While only one furrowing disc 50 is shown, it is contemplated that two furrowing discs can be included in the row unit 24. Many different types of furrowing disc constructions are known and could be included in the row unit 24. Optionally, the furrowing disc(s) 50 can be connected to the frame member 44 by a furrowing suspension assembly 64 including one or more adjustable gauge wheels 66 that are configured to adjust the depth of the trenches formed by the furrowing disc(s) 50 as the planter 10 travels along the field. Any suitable furrowing suspension assembly can be used to connect the furrowing disc(s) 50 to the frame member 44.

The closing discs 54 carried by the frame member 44 are held behind the furrowing disc 50 in the direction of travel 46 and also rotate as the planter 10 travels along the field. The closing discs 54 are configured to be dug into the ground and collapse the trench that is formed by the furrowing disc 50, by replacing the soil that is dislocated by the furrowing disc 50 or dislocating soil adjacent to the trench into the trench as the closing discs 54 rotate. Any suitable closing discs can be included in the row unit 24. Optionally, the closing discs 54 can have a closing suspension assembly 68 connecting the closing discs 54 to the mounting body 52 that assists in keeping the closing discs 54 at a uniform level within the soil as the planter 10 travels across the field. Any suitable closing suspension assembly can be used to connect closing discs 54 to the mounting body 52. While the row unit 24 is shown as including a pair of closing discs 54, it is contemplated that only one closing disc could be used. Further, the closing discs 54 do not need to be connected to the mounting body 52, but can also be connected to the frame member 44 so that the closing discs 54 are carried in the direction of travel 46 as the planter 10 and row unit 24 travel along the field.

Figure 3:
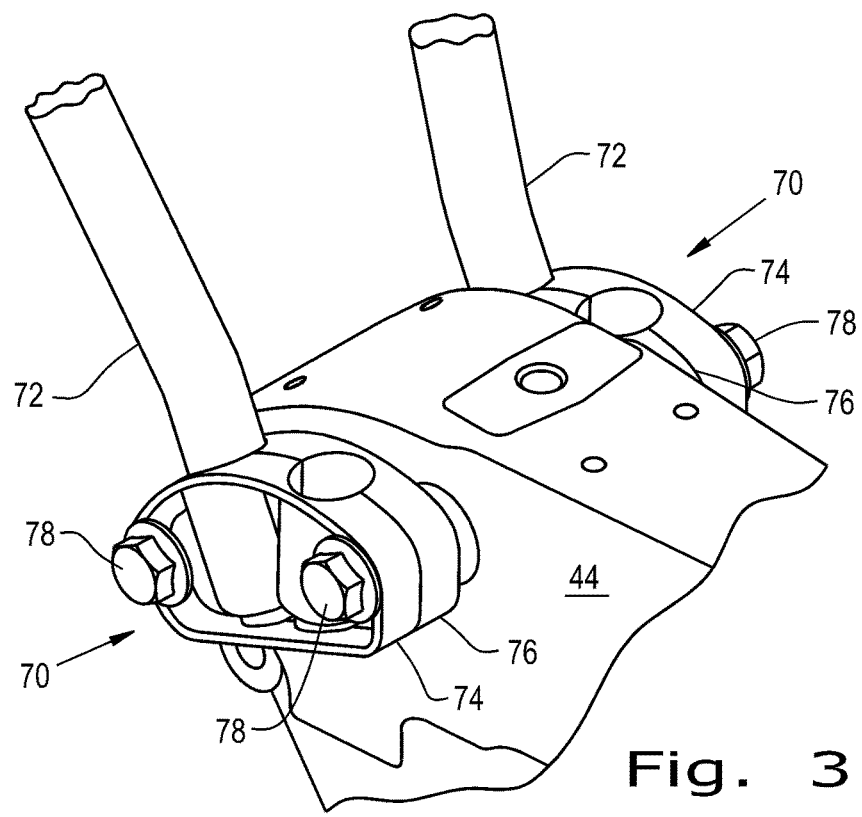
FIG. 3 is a closer perspective view of the clamping device used on the row unit of FIG. 2.
Figure 4:
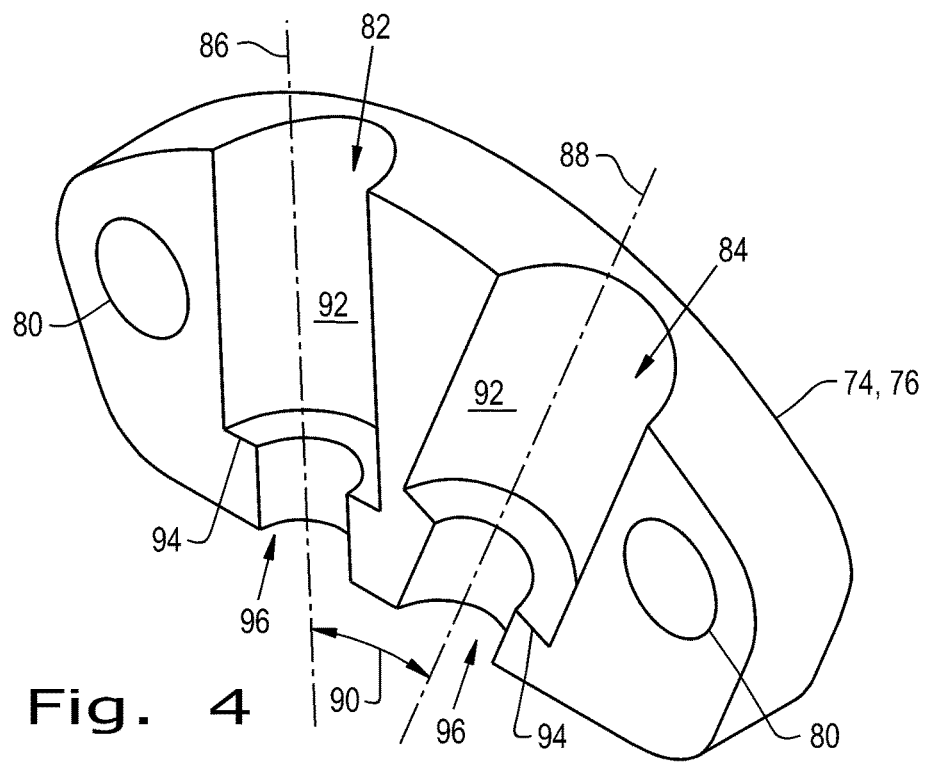
FIG. 4 illustrates one half of the clamping device seen in FIGS. 2 and 3 of the present invention.
Figure 5:
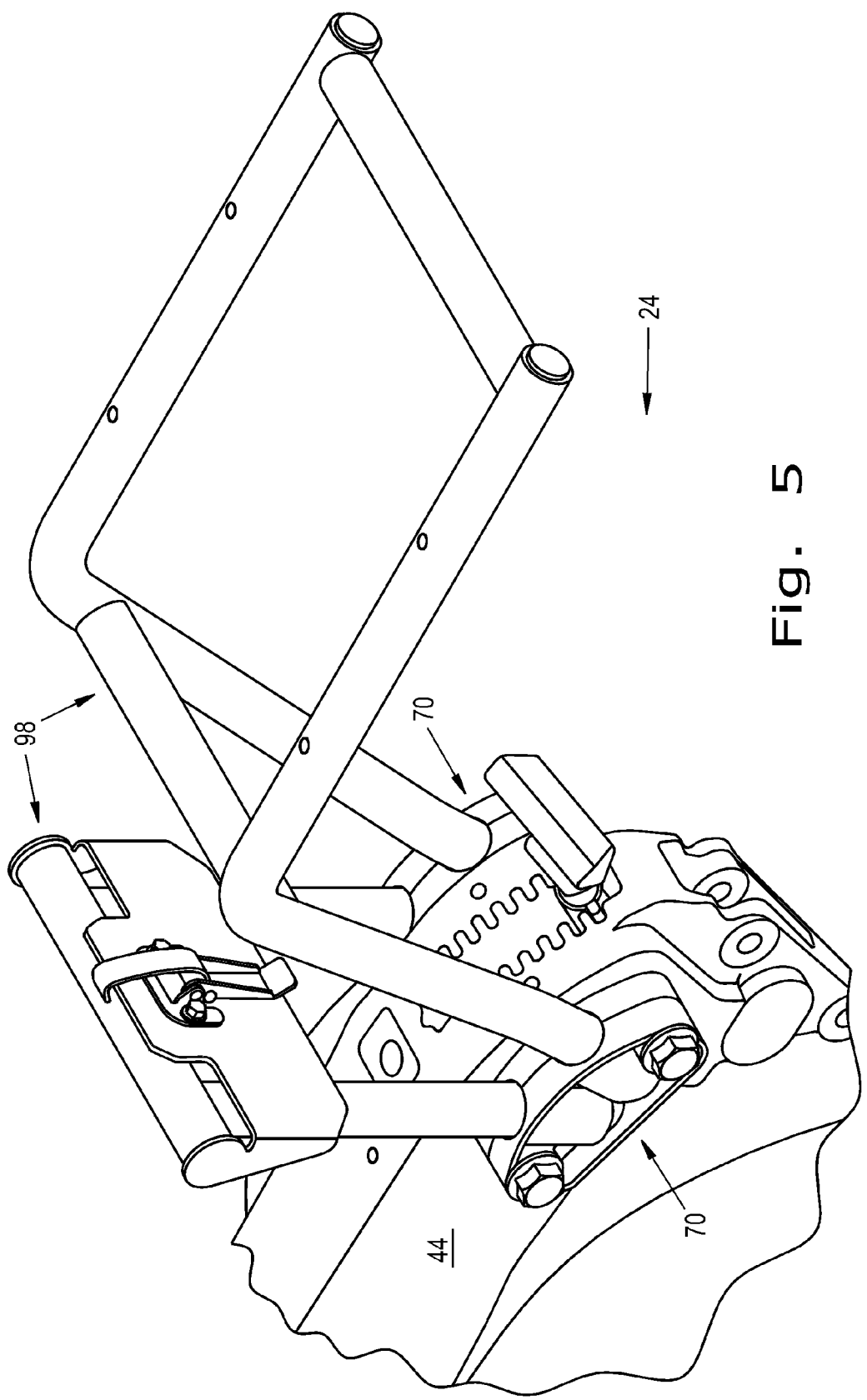
FIG. 5 illustrates two optional items coupled to the row unit by the clamping device of FIGS. 2-4.

Now, additionally referring to FIGS. 3-5, there is shown a clamping device 70 coupled to each side of frame member 44, and which clamps supports 72 and more broadly attachments 98 to row unit 24. Clamping devices 70 include two members 74 and 76 which are coupled to frame member 44 by way of bolts 78 that extend through holes 80. Members 74 and 76 each have cavities 82 and 84 that respectively have axis 86 and 88 that have an angle 90 therebetween. Cavities 82 and 84 each have a generally half cylindrical shape 92, with a bottom 94 and a hole 96 extending out of the bottom of members 74 and 76. Angle 90 as illustrated is 45°, although other angles or even a parallel relationship are all contemplated.

Members 74 and 76 are such that interior features 92 having the generally half cylindrical shape 92 are substantially mirror images so that the interior features of member 74 match with the interior features of member 76 so that a generally cylindrical cavity exists when members 74 and 76 are assembled with bolts 78. The overall cylindrical cavity is actually less than two halves since there is an allowance for a bit of space between members 74 and 76, such as a 1 mm space when the axis are aligned. This spacing allows the force applied by bolts 78 to member 74 is then applied to supports 72 and then to member 76 to thereby clamp the similarly sized cylindrical outer surface of supports 72 securely to frame member 44. The sizing of cavities 82 and 84 are such that the radius thereof is substantially the same as the radius of supports 72.

The interior features (92, 94 and 96) may be substantially identical between cavities 82 and 84 of both member 74 and 76. It is even contemplated that members 74 and 76 may be substantially identical or even identical and interchangeable.

When supports 72 of an attachment 98 are inserted into a set of cavities of clamping devices 70, such as shown in FIG. 3, supports 72 are inserted and the end of supports 72 rest against bottom 94 to thereby allow the installer to not hold attachment 98, and another attachment 98, such as seen in FIG. 5 can be inserted, then bolts 78 can be tightened. If there is only one attachment then it can be clamped as shown in FIG. 3. It is contemplated that more cavities than the two that are shown may be used, and that the angle 90 therebetween may vary from that shown and discussed herein.

In the prior art options or attachments are bolted on individually to a row unit. If they do share holes, bolts have to be replaced with longer ones to attach both components. This present invention simplifies the assembly process by using a common clamp setup. Options attach to the clamps independently or together. Clamping devices 70 squeeze the round tubing 72 to provide a secure way to attach the granular chemical frame and the on row hopper support. The clamps make it so you can have either option or both. They share the same hardware so no extra fasteners are required. The clamps also have a built in shoulder 94 for the tubing to sit on. The present invention provides proper placement to locate each option.

The present invention reduces the complexity in the manufacturing plant using common parts, and it makes it easier for users to add options to their planter.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
    a tool bar; and
    a row unit coupled to said tool bar, said row unit including:
        a frame member; and
        at least one clamping device coupled to the frame member, wherein said clamping device is configured to secure at least one attachment to the row unit without going through a part of said at least one attachment, each said clamping device having:
            a first member having first interior features defining a first partial cavity; and
            a second member having second interior features defining a second partial cavity that face said first interior features of said first member,
            wherein first and second partial cavities together define a cylindrical cavity having a first interior diameter configured to receive an attachment support of said at least one attachment,
            wherein said first partial cavity and said second partial cavity each have a bottom surface extending inward from interior sides of said first and second partial cavities, wherein said bottom surface of said first and second partial cavities is configured to support a bottom surface of said attachment support when said attachment support is inserted within said cylindrical cavity, and wherein said bottom surface of said first and second partial cavities extend partially inward from said interior sides such that the bottom surface of each of said first and second partial cavities together define a hole at a bottom of said cylindrical cavity that has a diameter less than said diameter of said cylindrical cavity.

2. The agricultural implement of claim 1, wherein said at least one clamping device is two clamping devices located on opposite sides of said frame member.

3. The agricultural implement of claim 1, wherein said first member and said second member each have two similar cavities each being generally one half of a cylindrically shaped cavity including a first cavity and a second cavity.

4. The agricultural implement of claim 3, wherein said first cavity and said second cavity each have an axis, wherein the axis of the first cavity and the axis of the second cavity form an acute angle relative to each other.

5. The agricultural implement of claim 4, wherein said acute angle is about 45 degrees.

6. A row unit for coupling to a tool bar of an agricultural implement, the row unit comprising:
    a frame member; and
    at least one clamping device coupled to the frame member, wherein said clamping device is configured to secure at least one attachment to the row unit without going through a part of said at least one attachment, each said clamping device having:
        a first member having first interior features defining a first partial cavity; and
        a second member having second interior features defining a second partial cavity that face said first interior features of said first member,
        wherein first and second partial cavities together define a cylindrical cavity having a first interior diameter configured to receive an attachment support of said at least one attachment,
        wherein said first partial cavity and said second partial cavity each have a bottom surface extending inward from interior sides of said first and second partial cavities, wherein said bottom surface of said first and second partial cavities is configured to support a bottom surface of said attachment support when said attachment support is inserted within said cylindrical cavity, and wherein said bottom surface of said first and second partial cavities extend partially inward from said interior sides such that the bottom surface of each of said first and second partial cavities together define a hole at a bottom of said cylindrical cavity that has a diameter less than said diameter of said cylindrical cavity.

7. The row unit of claim 6, wherein said at least one clamping device is two clamping devices located on opposite sides of said frame member.

8. The agricultural implement of claim 6, wherein said first member and said second member each have two similar cavities each being generally one half of a cylindrically shaped cavity including a first cavity and a second cavity.

9. The agricultural implement of claim 8, wherein said first cavity and said second cavity each have an axis, wherein the axis of the first cavity and the axis of the second cavity form an acute angle relative to each other.

10. The row unit of claim 9, wherein said acute angle is about 45 degrees.

* * * * *